(12) United States Patent
Kim et al.

(10) Patent No.: US 9,477,020 B2
(45) Date of Patent: Oct. 25, 2016

(54) DISPLAY APPARATUS

(71) Applicant: Samsung Display Co., Ltd., Yongin (KR)

(72) Inventors: Duk-Sung Kim, Asan-si (KR); Daeho Song, Wanju-gun (KR); Sungjae Park, Wonju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 25 days.

(21) Appl. No.: 14/518,329

(22) Filed: Oct. 20, 2014

(65) Prior Publication Data

US 2015/0253475 A1    Sep. 10, 2015

(30) Foreign Application Priority Data

Mar. 6, 2014   (KR) .................. 10-2014-0026683

(51) Int. Cl.
| | |
|---|---|
| *G02B 5/22* | (2006.01) |
| *G02B 7/00* | (2006.01) |
| *G02B 5/20* | (2006.01) |
| *G02F 1/1335* | (2006.01) |

(52) U.S. Cl.
CPC .......... *G02B 5/201* (2013.01); *G02F 1/133514* (2013.01); *G02F 2201/52* (2013.01)

(58) Field of Classification Search
CPC ........ G02B 5/201; G02B 5/22; G02B 5/223; G02B 5/285; G02B 5/20; G02F 1/133514; G02F 1/133512; G02F 1/133516; G02F 1/134309; G02F 2201/52; G02F 2001/134345; G02F 1/13336; G03F 7/0007; H01L 27/14621

USPC ....... 359/891, 892, 885, 580, 856, 588, 589, 359/590

See application file for complete search history.

(56) References Cited

U.S. PATENT DOCUMENTS

2007/0008462 A1* 1/2007 Yang ................. G02F 1/133514
 349/106
2012/0062824 A1* 3/2012 Lee ................... G02F 1/133514
 349/109

FOREIGN PATENT DOCUMENTS

| JP | 2013-113880 | 6/2013 |
|---|---|---|
| KR | 10-2010-0054242 | 5/2010 |
| KR | 10-2011-0071403 | 6/2011 |
| KR | 10-1207318 | 12/2012 |

* cited by examiner

*Primary Examiner* — Jade R Chwasz
(74) *Attorney, Agent, or Firm* — H.C. Park & Associates, PLC

(57) ABSTRACT

A display apparatus including a first substrate, a second substrate, a pixel, and a unit color filter. The first and second substrates are opposite to each other. The pixel is disposed between the first and second substrates. The color filter is disposed between the first substrate and the pixel or between the second substrate and the pixel. The color filter includes a red color filter, a green color filter, a blue color filter, and a yellow color filter. The yellow color filter includes a sub-red color filter and a sub-green color filter.

12 Claims, 4 Drawing Sheets

DISPLAY APPARATUS

CROSS-REFERENCE TO RELATED APPLICATION

This application claims priority under 35 U.S.C. §119 to Korean Patent Application No. 10-2014-0026683, filed on Mar. 6, 2014, which is hereby incorporated by reference for all purposes as if fully set forth herein.

BACKGROUND

1. Field

Inventive concepts of the present disclosure relate to display apparatuses and, more particularly, to display apparatuses with improved color impression.

2. Discussion of the Background

Red (R), green (G), and blue (B) data have been used to display an image. Additionally, an RGB pixel structure has been used to display images.

However, image data including various colors as the principal colors has been outputted through corresponding pixel structures to display an image, to improve the display quality of a screen. In this case, since the principal colors are different from each other in each step, the apparent brightness of shown colors may be distorted. In particular, if a color is shown by converting a color structure of RGB image data into a structure including RGB pixels and a white pixel, an apparent brightness of an image may be increased or reduced, according to a shown color. Particularly, if the brightness of a white image rapidly increases when a yellow image is shown on the white image through the RGBW pixel structure, the brightness of the yellow image may appear to be relatively reduced.

SUMMARY

Exemplary embodiments of the inventive concepts may provide a display apparatus capable of increasing a brightness ratio of a maximum yellow to a maximum white.

Exemplary embodiments of the inventive concepts may also provide a display apparatus capable of preventing any one of red, green, and blue colors from being improperly displayed.

Additional features of the invention will be set forth in the description which follows, and in part will be apparent from the description, or may be learned by practice of the invention.

According to exemplary embodiments of the inventive concepts, a display apparatus includes a first substrate and a color filter formed on the substrate. The color filter may include a red color filter, a green color filter, a blue color filter, and a yellow color filter, and the yellow color filter may include a sub-red color filter and a sub-green color filter.

The display apparatus may further include a second substrate opposite to the first substrate; and a pixel disposed between the first substrate and the second substrate.

The color filter may be disposed between the first substrate and the pixel or between the second substrate and the pixel. The color filter further may further include a white color filter.

The color filter may include a unit color filter including the red color filter, the blue color filter, the green color filter, the white color filter, and the yellow color filter, and the unit color filter may be repeatedly arranged.

A sum of the areas of the red color filter and the sub-red color filter may be equal to a sum of the areas of the green color filter and the sub-green color filter. Additionally, the sum of the areas of the red color filter and the sub-red color filter may also be equal to the area of the blue color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
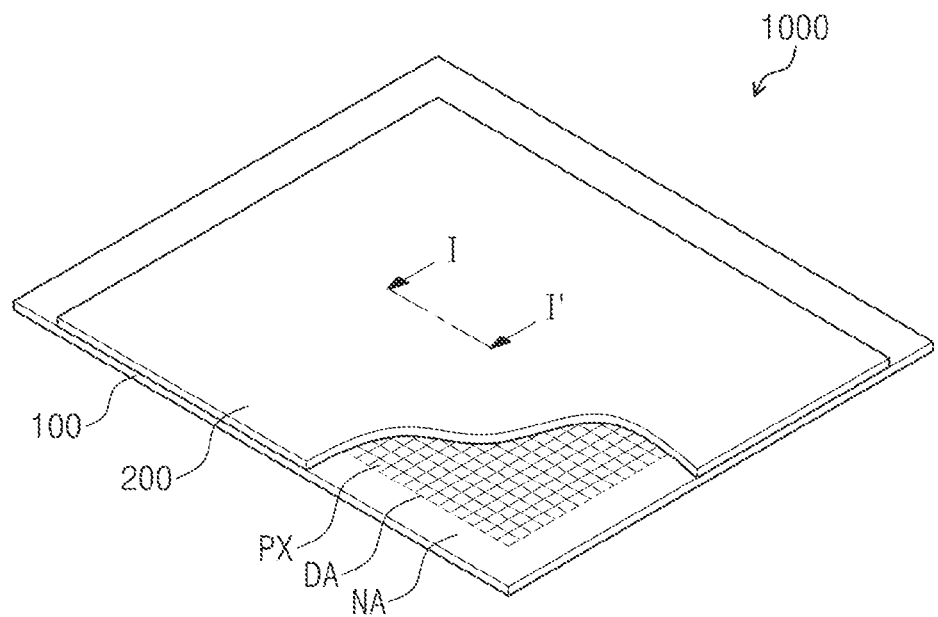
FIG. 1 is a perspective view showing a display apparatus according to exemplary embodiments of the present inventive concepts.

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
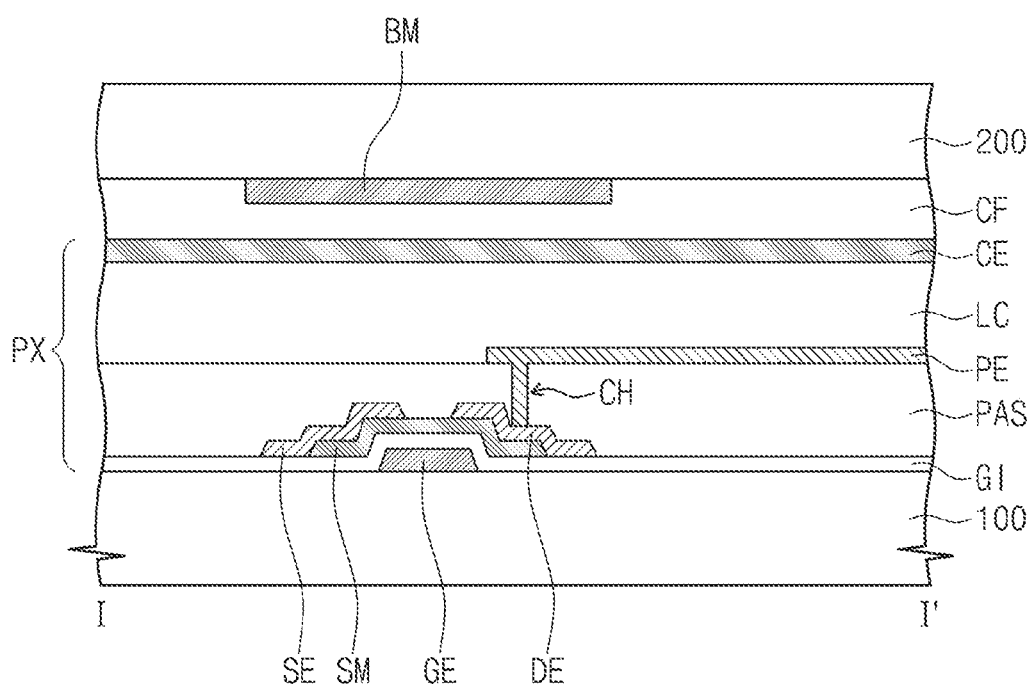
FIG. 2 is a cross-sectional view taken along a line I-I' of FIG. 1, showing one pixel.

FIG. 1 is a perspective view showing a display apparatus 1000 according to exemplary embodiments of the present inventive concepts, and FIG. 2 is a cross-sectional view taken along a line I-I' of FIG. 1 showing one pixel. Referring to FIGS. 1 and 2, the display apparatus 1000 includes a first substrate 100, a second substrate 200, a pixel PX, and a color filter CF.

The display apparatus 1000 may be one of an organic light emitting display apparatus, a liquid crystal display apparatus, a plasma display apparatus, an electrophoretic display apparatus, and electro-wetting display apparatus. If the display apparatus 1000 is the organic light emitting display apparatus, an image display layer (e.g., an organic light emitting layer) disposed between an anode electrode and a cathode electrode may emit white light. The white light may be transmitted through a color filter, so as to be converted into light having a specific color. Hereinafter, the display apparatus 1000 will be described in terms of a liquid crystal apparatus, as an example.

The first substrate 100 and the second substrate 200 may be disposed to face each other. The first and second substrates 100 and 200 may be transparent insulating substrates.

The display apparatus 1000 may include a display area DA and a non-display area NA surrounding the display area DA. An image may be displayed through the display area DA, but is not displayed in the non-display area NA.

The display apparatus 1000 may include a plurality of the pixels PX in the display area DA. The pixels PX may be arranged a matrix between the first substrate 100 and the second substrate 200. Each pixel PX includes a thin film transistor TR, a pixel electrode PE, a common electrode CE, and an image display layer (e.g., a liquid crystal layer LC).

FIG. 2 shows one thin film transistor TR. However, in other exemplary embodiments, one pixel PX may include a plurality of thin film transistors. The thin film transistor TR may include a gate electrode GE, a semiconductor pattern SM, a source electrode SE, and a drain electrode DE.

The gate electrode GE is disposed on the first substrate 100. A gate insulating layer GI may be disposed on the gate electrode GE. The gate insulating layer GI may be formed of an inorganic insulating layer or an organic insulating layer. The gate insulating layer GI electrically insulates the gate electrode GE from the semiconductor pattern SM, the source electrode SE, and the drain electrode DE.

The semiconductor pattern SM is disposed on the gate insulating layer GI to overlap with the gate electrode GE. The semiconductor pattern SM may be formed of one of amorphous silicon, poly-silicon, and an oxide semiconductor. A portion of the semiconductor pattern SM is used as a channel region of the thin film transistor TR.

The source electrode SE is connected to one end of the semiconductor pattern SM, and the drain electrode DE is connected to another end of the semiconductor pattern SM.

The source electrode SE and the drain electrode DE may be spaced apart from each other.

A passivation layer PAS may be formed on the source electrode SE and the drain electrode DE. The passivation layer PAS may have a planarized top surface and may be formed of a single-insulating layer or a plurality of insulating layers. The passivation layer PAS may be formed of at least one of an inorganic insulating layer and an organic insulating layer. The passivation layer PAS has a contact hole CH exposing a portion of the drain electrode DE.

The thin film transistor TR outputs a signal received in the source electrode SE to the drain electrode DE, in response to a gate signal applied to the gate electrode GE. The pixel electrode PE is disposed on the passivation layer PAS and is connected to the drain electrode DE through the contact hole CH. The common electrode CE is formed on the second substrate 200 and faces the pixel electrode PE.

The liquid crystal layer LC (i.e., the image display layer) may be disposed between the pixel electrode PE and the common electrode CE. The liquid crystal layer LC includes liquid crystal molecules.

A data voltage may be applied to the pixel electrode PE through the thin film transistor TR, and a common voltage may be applied to the common electrode CE. The orientation of the liquid crystal molecules of the liquid crystal layer LC may be changed by an electric filed generated between the pixel electrode PE and the common electrode CE, in order to control light transmittance there through.

The color filter CF may be disposed between the first substrate 100 and the pixel PX, or between the second substrate 200 and the pixel PX. In detail, the color filter CF may be disposed between the gate electrode GE and the first substrate 100, or between the common electrode CE and the second substrate 200. Hereinafter, an example where the color filter CF is disposed between the common electrode CE and the second substrate 200 will be described.

The color filter CF may be formed to correspond to the pixel PX and may provide a color to light passing through the pixel PX. The color filter CF will be described in more detail later.

The display apparatus 1000 may further include a black matrix BM. The black matrix BM may be formed between adjacent color filters CF, to prevent different colors of the adjacent color filters CF from being mixed. In addition, the black matrix BM may be formed to overlap with the thin film transistor TR, a gate line (not shown) connected to the gate electrode GE, and a data line (not shown) connected to the source electrode SE, to prevent the thin film transistor TR, the gate line (not shown), and the data line (not shown) from being externally visible.

Figure 3:
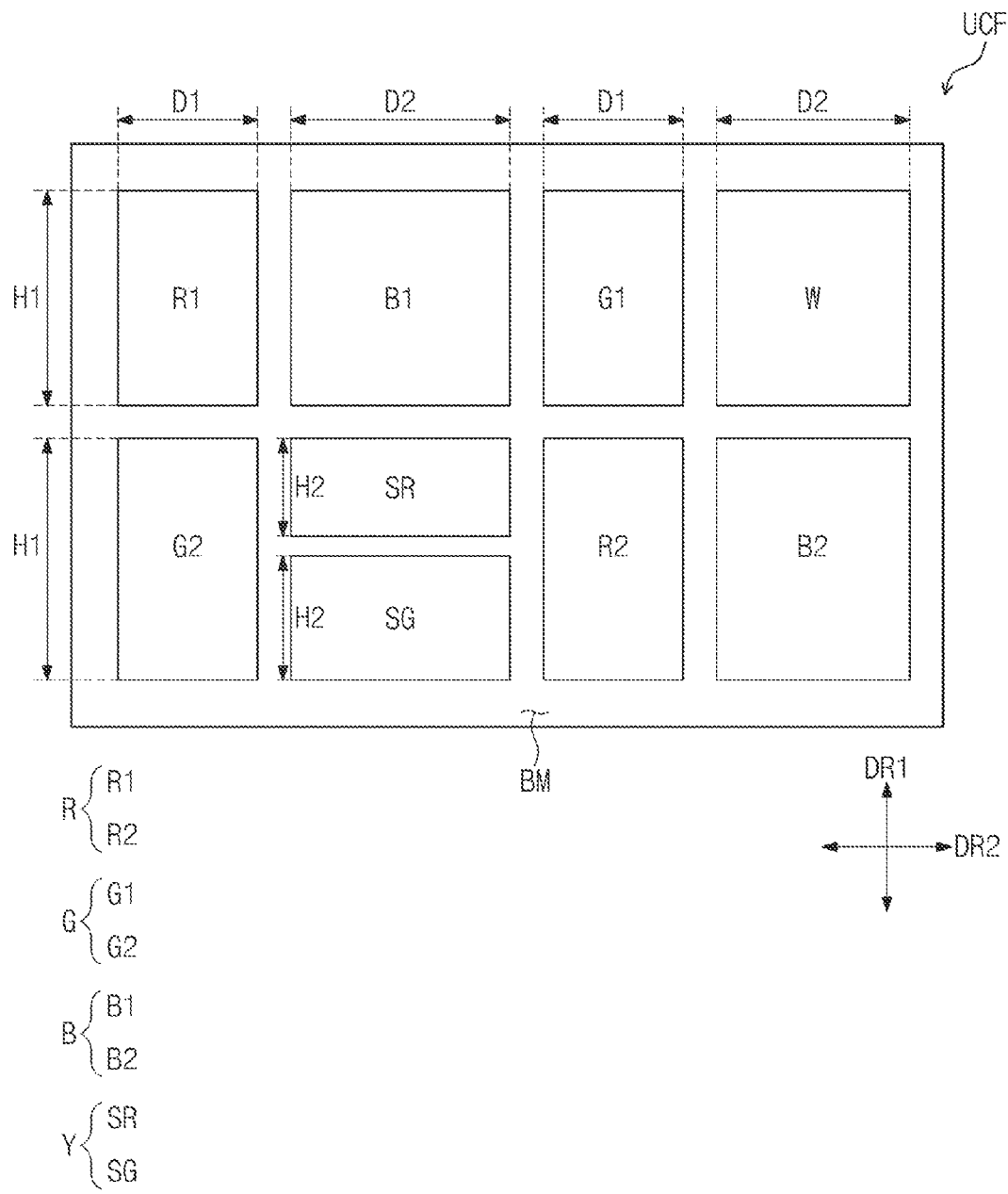
FIG. 3 is a plan view showing a color filter and a portion adjacent to the color filter in a display apparatus according to exemplary embodiments of the inventive concepts.

FIG. 3 is a plan view showing a color filter and a portion adjacent to the color filter, of a display apparatus according to exemplary embodiments of the inventive concepts. For the purpose of convenience in explanation, the following description assumes that one color filter has substantially the same planar area as one pixel.

Referring to FIG. 3, a unit color filter UCF may include a plurality of the color filters. A plurality of the unit color filters UCF may be repeatedly arranged. The color filters in the unit color filter UCF may be arranged in a 2×4 matrix. The unit color filter UCF may include a red color filter R, a blue color filter B, a green color filter G, a white color filter W, and yellow color filter Y.

As illustrated in FIG. 3, the black matrix BM may be disposed between the color filters R, B, G, W, and Y. However, the black matrix BM may be in other configurations or may be omitted, according to some exemplary embodiments.

The yellow color filter Y may include a sub-red color filter SR and a sub-green color filter SG. In other words, the yellow color filter Y is not formed of an additional material having a yellow color. The sub-red color filter SR of the yellow color filter Y may be formed during a process of forming the red color filter R, and the sub-green color filter SG of the yellow color filter Y may be formed during a process of forming the green color filter G. In FIG. 3, the black matrix BM is also disposed between the sub-red color filter SR and the sub-green color filter SG. However, in other exemplary embodiments, the black matrix BM may not be disposed between the sub-red color filter SR and the sub-green color filter SG.

The sub-red color filter SR and the sub-green color filter SG are arranged along a column direction DR1 in FIG. 3. However, in other exemplary embodiments, the sub-red color filter SR and the sub-green color filter SG may be arranged along a row direction DR2.

The red color filter R may include a first red color filter R1 and a second red color filter R2. The blue color filter B may include a first blue color filter B1 and a second blue color filter B2. The green color filter G may include a first green color filter G1 and a second green color filter G2.

The color filters constituting a first row of the unit color filter UCF may include the first red color filter R1, the first blue color filter B1, the first green color filter G1, and the white color filter W, which are arranged in the stated order. The color filters constituting a second row of the unit color filter UCF may include the second green color filter G2, the yellow color filter Y, the second red color filter R2, and the second blue color filter B2, which are arranged in the stated order.

However, the inventive concepts include other arrangements of the color filters of the unit color filter UCF. For example, in other exemplary embodiments, all the color filters of the first row may switch places with all the color filters of the second row. In addition, the yellow color filter Y and the white color filter W may switch places with each other.

A first column of the unit color filter UCF includes the first red color filter R1 and the second green color filter G2. A second column of the unit color filter UCF includes the first blue color filter B1 and the yellow color filter Y. A third column of the unit color filter UCF includes the first green color filter G1 and the second red color filter R2. A fourth column of the unit color filter UCF includes the white color filter W and the second blue color filter B2.

However, the color filters of the first column and the color filters of the second column may switch places with the color filters of the third column and the color filters of the fourth column. In addition, the color filters of the first column may switch places with the color filters of the second column, and the color filters of the third column may switch places with the color filters of the fourth column.

Herein, an "area" of a color filter refers to a surface area covered by a color filter. A sum of the areas of the red color filter R and the sub-red color filter SR may be equal to a sum of the areas of the green color filter G and the sub-green color filter SG. In addition, the sum of the areas of the red color filter R and the sub-red color filter SR may be equal to the area of the blue color filter B. Thus, the sum of the areas of the green color filter G and the sub-green color filter SG may also be equal to the area of the blue color filter B.

In detail, a sum of the areas of the first red color filter R1, the second red color filter R2, and the sub-red color filter SG may be equal to a sum of the areas of the first green color filter G1, the second green color filter G2, and the sub-green color filter SG, and may be equal to a sum of the areas of the first blue color filter B1 and the second blue color filter B2. The color filters of the first row and the color filters of the second row may have the same height (length) H1 in the column direction DR1.

The color filters of the first column may have the same width in the row direction DR2. Likewise, the color filters of the second column may have the same width in the row direction DR2. The color filters of the third column may have the same width in the row direction DR2. The color filters of the fourth column may have the same width in the row direction DR2. In more detail, the width of the first red color filter R1 may be equal to the width of the second green color filter G2, and the width of the first blue color filter B1 may be equal to the width of the yellow color filter Y. The width of the first green color filter G1 may be equal to the width of the second red color filter R2, and the width of the white color filter W may be equal to the width of the second blue color filter B2.

The color filters of the first column may have a first width D1, and the color filters of the second column may have a second width D2 greater than the first width D1. The color filters of the third column may have the first width D1, and the color filters of the fourth column may have the second width D2.

The area of the sub-red color filter SR may be equal to the area of the sub-green color filter SG. In more detail, the sub-red color filter SR and the sub-green color filter SG may have the same height H2 in the column direction DR1 and the second width D2 in the row direction DR2.

Since the yellow color filter Y adds color filters having the red color and the green color are added to the unit color filter UCF, the blue color filter B can be formed to have the second width D2 that is greater than the first width D1 of the red and green color filters R and G. As a result, the areas of the red, green, and blue color filters may be equal to each other in the unit color filter UCF. Since the areas occupied by the red, green, and blue color filters are equal to each other, even though the yellow color filter Y is added, it is possible to prevent the quality of any one of the red, green, and blue colors from being reduced.

Figure 4:
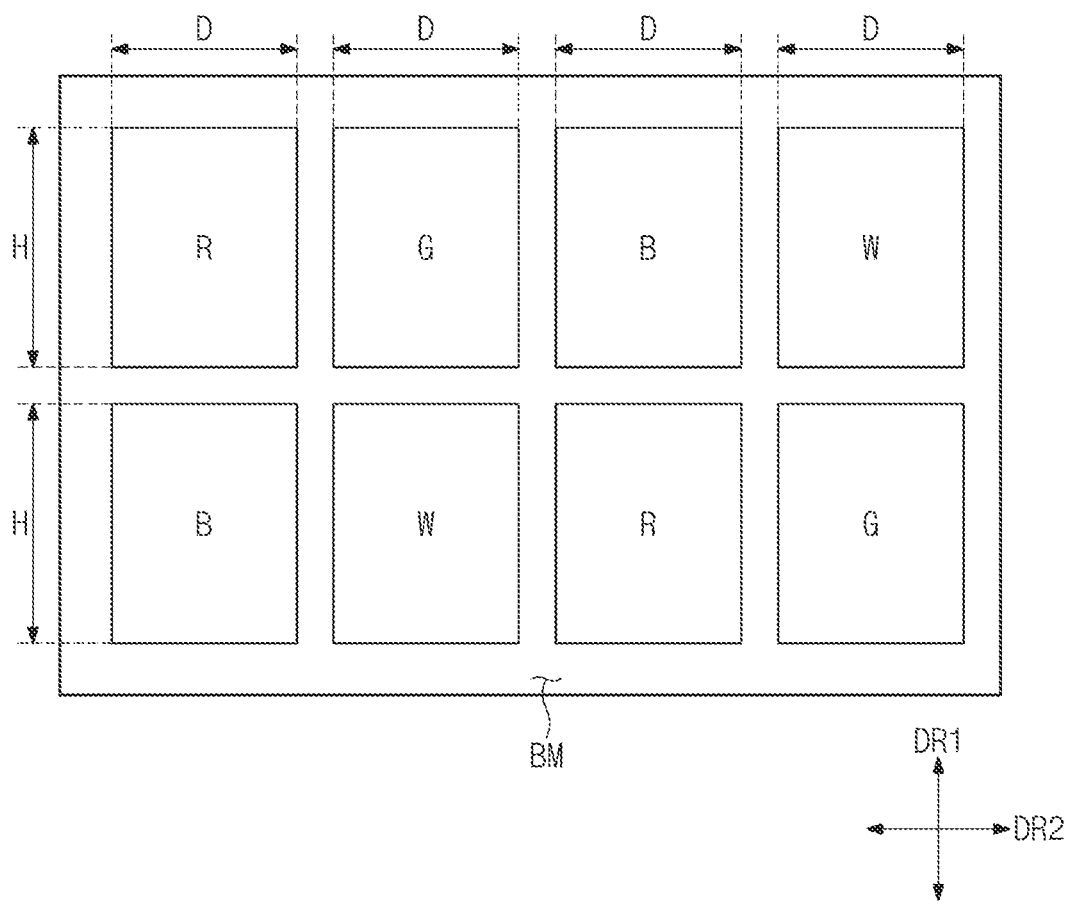
FIG. 4 is a plan view showing a color filter and a portion adjacent to the color filter in a display apparatus of a comparison example.

FIG. 4 is a plan view showing a color filter and a portion adjacent to the color filter in a display apparatus of a comparison example. Referring to FIG. 4, eight color filters arranged in a 2×4 matrix form are repeatedly arranged in a comparison example. The color filters of the comparison example included two red color filters, two green color filters, two blue color filters, and two white color filters. The color filters of the comparison example have the same height H1 in a column direction DR1 and the same width D in a row direction DR2.

Since the number of the white color filters is equal to the number of the red color filters, the number of the green color filters, and the number of the blue color filters, color impression of a yellow image may be degraded, when the yellow image is displayed on a white background of a display apparatus. In the comparison example, a brightness ratio of the maximum yellow to the maximum white (Y/W) was 37.6%, in consideration of light loss occurring in the display apparatus.

On the other hand, in the display apparatus 1000 of FIGS. 1 to 3, a brightness ratio of the maximum yellow to the maximum white (Y/W) was 56.6%, in consideration of light loss occurring in the display apparatus 1000. In other words, the brightness ratio of the display apparatus 1000 according to the inventive concepts was about 1.5 times greater than that of the display device of the comparison example.

Even though the structure of FIG. 3 is simply compared with the structure of FIG. 4, a ratio of the areas of the red and green color filters to an entire area of the unit color filter UCF in the structure of FIG. 3 is greater than that of the structure of FIG. 4. Thus, the brightness ratio of the maximum yellow to the maximum white of the structure of FIG. 3 is greater than that of the structure of FIG. 4.

Figure 5:
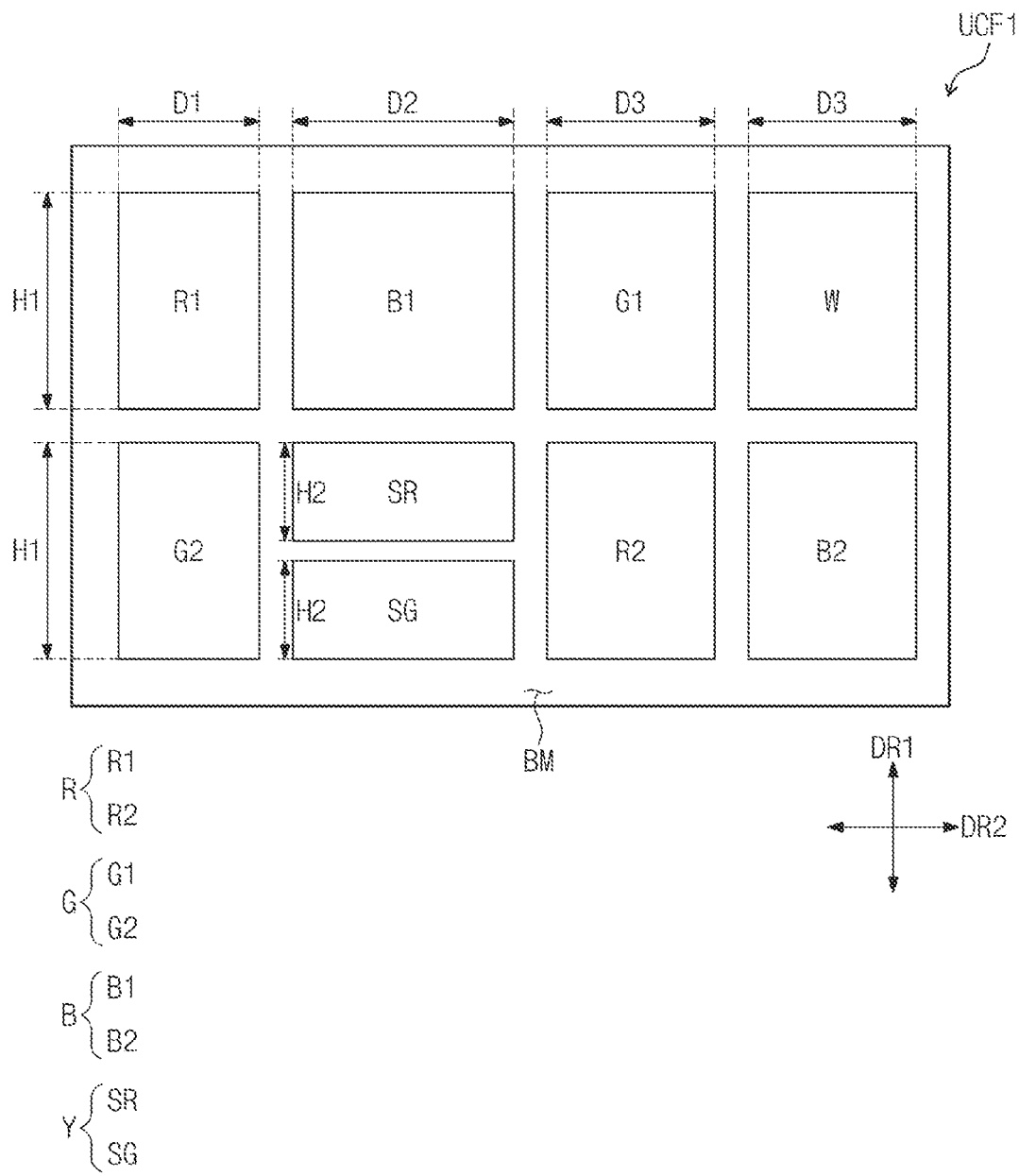
FIG. 5 is a plan view showing a color filter and a portion adjacent to the color filter in a display apparatus according to other exemplary embodiments of the present inventive concepts.

FIG. 5 is a plan view showing a color filter and a portion adjacent to the color filter in a display apparatus according to other embodiments of the inventive concepts. For the purpose of convenience in explanation, the following description assumes that one color filter has substantially the same planar area as a corresponding pixel Referring to FIG. 5, a unit color filter UCF1 may include a plurality of the color filters. A plurality of the unit color filters UCF may be repeatedly arranged. The unit color filter UCF1 of FIG. 5 may be substantially similar to the unit color filter UCF of FIG. 3, except for differences in the widths of the color filters of the unit color filter UCF1 of FIG. 5. Hereinafter, differences between the unit color filter UCF1 of FIG. 5 and the unit color filter UCF of FIG. 3 will be mainly described. The same descriptions as described with reference to FIG. 3 will be omitted or mentioned briefly for the purpose of ease and convenience in explanation.

A sum of the areas of the red color filter R and the sub-red color filter SR may be equal to a sum of the areas of the green color filter G and the sub-green color filter SG. Also, the sum of the areas of the red color filter R and the sub-red color filter SR may be equal to the area of the blue color filter B. Thus, the sum of the areas of the green color filter G and the sub-green color filter SG may also be equal to the area of the blue color filter B.

The color filters of the first column may have a first width D1, and the color filters of the second column may have a second width D2 greater than the first width D1. The color filters of the third column may have a third width D3 that is greater than the first width D1 and is smaller than the second width D2. The color filters of the fourth column may have the third width D3.

Even though the widths of the color filters are determined as illustrated in FIG. 5, the areas of the red, green, and blue color filters may be equal to each other in the unit color filter UCF1. Thus, it is possible to prevent the quality of any one of the red, green, and blue colors from being reduced.

The display apparatus according to the inventive concepts includes the yellow color filter having the sub-red color filter and the sub-green color filter to increase the brightness ratio of the maximum yellow to the maximum white of the display apparatus.

In addition, even though the yellow color filter is added into the display apparatus, the areas of the red, green, and blue color filters are equal to each other. Thus, the quality of any one of the red, green, and blue colors is not reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a first substrate; and
a unit color filter disposed on the first substrate, the unit color filter comprising first and second red color filters, first and second green color filters, first and second blue color filters, and a yellow color filter,
wherein:
the yellow color filter comprises a sub-red color filter and a sub-green color filter;
a total number of the first green color filter, the second green color filter, and the sub-green color filter is greater than a total number of the first blue color filter and the second blue color filter;
a total number of the first red color filter, the second red color filter, and the sub-red color filter is greater than the total number of the first blue color filter and the second blue color filter;
a sum of the areas of the first and second red color filters and the sub-red color filter is equal to a sum of areas of the first and second green color filters and the sub-green color filter; and
the sum of the areas of the first and second red color filters and the sub-red color filter is equal to a sum of the areas of the first and second-blue color filters.

2. The display apparatus of claim 1, further comprising:
a second substrate facing the first substrate; and
a pixel disposed between the first substrate and the second substrate,
wherein the unit color filter is disposed between the first substrate and the pixel, or between the second substrate and the pixel.

3. The display apparatus of claim 2, wherein the pixel comprises:
a thin film transistor disposed on the first substrate;
a pixel electrode disposed on the first substrate and connected to the thin film transistor;
a common electrode disposed on the second substrate and opposite to the pixel electrode; and
an image display layer disposed between the pixel electrode and the common electrode.

4. The display apparatus of claim 1, wherein the unit color filter further comprises a white color filter.

5. The display apparatus of claim 4, further comprising a plurality of the unit color filters disposed on the first substrate.

6. The display apparatus of claim 1, wherein:
the color filters in the unit color filter are arranged in a 2×4 matrix of columns and rows;
a first row of the unit color filter comprises the first red color filter, the first blue color filter, the first green color filter, and the white color filter that are arranged in the stated order; and
a second row of the unit color filter comprises the second green color filter, the yellow color filter, the second red color filter, and the second blue color filter that are arranged in the stated order.

7. The display apparatus of claim 6, wherein the heights in a column direction of the color filters of the first row are equal to the heights in the column direction of the color filters of the second row.

8. The display apparatus of claim 6, wherein:
the widths of the color filters of a first column in the unit color filter are equal to each other;
the widths of the color filters of a second column in the unit color filter are equal to each other;
the widths of the color filters of a third column in the unit color filter are equal to each other; and
the widths of the color filters of a fourth column in the unit color filter are equal to each other.

9. The display apparatus of claim 8, wherein:
the color filters of the first column each have a first width; and
the color filters of the second column each have a second width that is greater than the first width.

10. The display apparatus of claim 9, wherein:
the color filters of the third column have the first width; and
the color filters of the fourth column have the second width.

11. The display apparatus of claim 9, wherein the color filters of the third column and the color filters of the fourth column have a third width that is greater than the first width and is smaller than the second width.

12. The display apparatus of claim 1, wherein the area of the sub-red color filter is equal to the area of the sub-green color filter.

* * * * *